United States Patent Office 3,513,493
Patented May 26, 1970

3,513,493
PROCESS FOR THE COLORING OF MATERIALS BASED ON CELLULOSE ACETATE EMPLOYING, AS CARRIER, CYANOALKYLATION PRODUCTS
Jean Perronin, Chantilly, and Iskender Galal Zogu, Creil, France, assignors to Ugine Kuhlmann, Paris, France
No Drawing. Continuation-in-part of application Ser. No. 563,948, July 11, 1966. This application Sept. 27, 1967, Ser. No. 671,091
Claims priority, application France, Aug. 11, 1965, 27,949
Int. Cl. D06p 5/06
U.S. Cl. 8—166                                       9 Claims

ABSTRACT OF THE DISCLOSURE

A process for printing, dyeing, discharging or optical bleaching of material based on cellulose acetate which comprises the use, as a carrier, of an acyclic compound containing at least one group having the formula

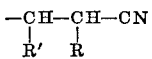

wherein R and R' represent hydrogen atoms or methyl groups.

A composition for subjecting a material based on cellulose acetate to dyeing, printing, discharging or optical bleaching containing a carrier comprising an acyclic compound containing at least one group having the formula

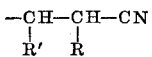

wherein R and R' represent hydrogen atoms or methyl groups.

---

The present application is a continuation-in-part application of our application No. 563,948 of July 11, 1966, and now abandoned and concerns a process for the treatment of materials based on cellulose acetate.

It is known that textile fibres based on cellulose diacetate or cellulose triacetate are generally printed or dyed with plastosoluble dyestuffs, which usually require elevated temperatures for fixing.

In order to facilitate the printing or dyeing it has been proposed to add to the pastes or baths, solvents, swelling agents or carriers, such as for example glycols, phenylmethylcarbinol, acetic acid or its esters, acetins, urea, thiourea, formamide, dimethyl formamide, dimethyl sulphoxide, methyl-ethyl ketone, diacetone alcohol, γ-butyrolactone, dioxan, adiponitrile, nitrophenol, nitromethane, glycol-formal, methylene chloride, alkyl phthalates, glycol, salicylates, butyl benzoacetate, polyvinyl ethers, or zinc chloride. These agents enable the duration or the temperature of fixation of the plastosoluble dyestuffs to be reduced.

Moreover they enable other classes of dyestuffs to be used, such as for example metalliferous complexes, acid dyestuffs, dyestuffs intended more particularly for dyeing polyester fibres, reactive dyestuffs, vat dyestuffs or fluorescent brightening agents. The results obtained are rarely satisfactory, however, especially with the last five classes of dyestuffs. Among the disadvantages caused by these solvents, swelling agents or carriers may be mentioned: reduction of the brightness of the dyestuffs and of their yields; sublimation of the dyestuffs with a possible appearance of spreading around the printed patterns; precarious fixation of the dyestuffs, from which follows lack of fastness to wet tests; reduction in the dynamometric strength of the fibres; insufficient solubility or dispersiveness in water, which causes difficulty in removing them from the fabric by washing and defects in uniformity; incompatibility with some thickeners, dispersing agents, surface-active agents or certain emulsions used in the printing pastes or the dyebaths; too great volatility, which causes loss of efficiency during thermal treatments.

The present invention therefore has as its object an improvement in processes for printing, dyeing, discharging and optical bleaching of fabrics, threads, cards, films and other supports based on cellulose triacetate or cellulose diacetate. This new process is characterised by the fact that an acyclic compound containing at least one

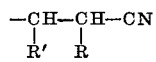

group, R and R' represent hydrogen atoms or —CH₃ groups, is used as a swelling agent or carrier. Such compounds may be obtained by cyanoalkylation, if desired in the presence of a catalyst, of compounds containing one or more mobile hydrogen atoms, such as compounds containing at least one —OH or —SH group or at least one activated —CH=, —CH₂— or —CH₃ group.

Acrylonitrile, α-methylacrylonitrile and crotononitrile are examples of compounds which may be used for the cyano-alkylation, and as examples of compounds containing at least one mobile hydrogen atom there may be mentioned water, alcohols, polyols, oximes, hydrogen sulphide, mercaptans, and compounds containing a —CO—, —CHO, —NO₂, —SO₂— or —CCl₃ group in the α-position to a =CH—, —CH₂— or —CH₃ group. The catalyst may be, for example, an alkali metal or an oxide, hydroxide, alcoholate, hydride, cyanide or amide of an alkali metal. Quaternary ammonium hydroxides, for example benzyltrimethyl-ammonium hydroxide, or tertiary amines such as triethylamine, may also be used as catalysts if their basic character is sufficiently marked. The amount of catalyst to be used may vary from 0.01% to 5% of the weight of nitrile and the condensation temperature may vary within wide limits, preferably between the ambient temperature and the boiling temperature of the nitrile or the compound to be cyano-alkylated, and the reaction may be carried out under pressure.

The carriers defined above may be used in proportions varying within wide limits. For example, for printing, 0.5% to 30% of the total weight of the printing paste, and for dyeing, 5 g. to 300 g. per litre, preferably 50 g. to 100 g. per litre of bath liquid may be used.

According to the invention, materials based on cellulose diacetate or triacetate may be satisfactorily dyed or printed with plastosoluble dyestuffs, metalliferous complexes, dyestuffs intended more particularly for dyeing polyester fibres, vat dyestuffs, basic dyestuffs, acidic dyestuffs, reactive dyestuffs and fluorescent brightening agents, by incorporating compounds containing one or more

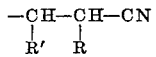

groups in the printing paste or the dyebath. These carriers have swelling properties with respect to the fibre and solubilising properties with respect to the dyestuffs. They thus improve the diffusion of the molecules and consequently the fixing of the dyestuffs. The use of the carriers defined above enables colorations having good fastness to light and to gas fading, as well as an exceptional stability towards wet tests at 95° C. and sublimation tests at 210° C. to be obtained, especially with acid mono- or di-sulphonated dyestuffs having a plasto-soluble character. It should be noted that the tinctorial yields obtained on cellulose acetate fibres are often greater than those obtained on the polyamide fibres for which these dyestuffs are generally recommended.

It was unexpected that the acid dyestuffs could be fixed as easily and as firmly on fibres, such as for example cellulose acetate or triacetate, having an acid chracter and being slightly plastic.

The following examples, in which the parts indicated are parts by weight and the temperatures are in degrees centigrade, are purely illustrative.

EXAMPLE 1

A printing paste is prepared containing the following ingredients:

- 3 parts of 1 - methylamino - 4 - β-hydroxyethylamino-anthraquinone
- 5 parts of the condensation product from one mole of thiodiethylene glycol with 2 moles of acrylonitrile
- 36 parts of water at 45° C.
- 55 parts of a thickener based on 33% industrial gum
- 1 part of sodium meta-nitrobenzene sulphonate 100 parts A fabric consisting of cellulose triacetate fibres known as "Trialbene" is printed with this paste. After drying, it is steamed at a temperature of 100–102° C. for 45 minutes. It is then rinsed, washed and dried by the usual methods. A blue shade is obtained having good fastness to wet tests.

In the absence of the condensation product or on replacing this with 5 parts of thiodiethylene glycol or with 5 parts of diethylene glycol, a shade distinctly less bright and a very inferior tinctorial yield are obtained under the same fixing conditions.

EXAMPLE 2

A printing paste is prepared containing the following ingredients:

- 4 parts of the dyestuff marketed as Amichrome Light Red RBL powder (C.I. Acid Red 226)
- 5 parts of the condensation product from one mole of acetaldehyde and 2 moles of acrylonitrile
- 31 parts of water at 90° C.
- 60 parts of a 13% carboxymethyl starch thickener 100 parts A triacetate fabric is printed with this paste. After drying, it is steamed at a temperature of 115° C. for 20 minutes, rinsed, washed and dried. A red shade is thus obtained having a tinctorial yield distinctly superior to that obtained, under the same conditions, with a paste prepared without the condensation product.

EXAMPLE 3

A printing paste is prepared containing the following ingredients:

- 3 parts of 4-nitro (N-ethyl-N-hydroxyethyl) 4'-amino-azobenzene
- 5 parts of the condensation product from one mole of glycerol and 2 moles of acrylonitrile
- 27 parts of water at 45° C.
- 65 parts of a 13% carboxymethyl starch thickener 100 parts A triacetate fabric is printed with this paste. After drying, it is fixed by heat at 160° C. for 3 minutes, rinsed, washed and dried. A red shade with good fastness is thus obtained.

Under the same conditions, but in the absence of the condensation product, the fixation of the dyestuff is indifferent.

On the other hand, on providing to best previous conditions, i.e. on replacing the condensation product with 5 parts of diethylene glycol and 10 parts of urea, it is necessary to fix by heat for 6 minutes at this temperature in order to obtain the same depth of colour.

In addition, on comparing the patterns obtained with those printed by the process according to the invention and fixed by heat at 160° C. for 3 to 6 minutes, it is found that the condensation product enables the sublimation of the dyestuff during the heat treatment to be avoided, and consequently the spreading around the printed patterns.

EXAMPLE 4

A printing paste is prepared containing the following ingredients:

- 8.0 parts of the dyestuff marketed as Esterophile Light Blue BLL paste (C.I. Disperse Blue 151)
- 5.0 parts of the condensation product from one mole of ethylene glycol and 2 moles of acrylonitrile
- 43.5 parts of water at 45° C.
- 0.5 parts of crystalline oxalic acid
- 43.0 parts of a water-in-oil emulsion prepared by running, with stirring, a mixture of 8 parts of calcium chloride in a 2% aqueous solution and 20 parts of 13% carboxymethyl starch into a mixture of 8 parts of an emulsifying agent soluble in the oil phase marketed by the name of concentrated Fond Néopâte 0 and 7 parts of white spirit of low boiling point 100.0 parts A triacetate fabric is printed with this paste. After drying, it is fixed by heat at 210° C. for one minute, rinsed, washed and dried. A blue shade is obtained with a tinctorial yield distinctly superior to that obtained under the same conditions in the absence of the condensation product or by replacing the emulsion by a 13% solution of carboxymethyl starch, and the condensation product by phenylmethylcarbinol.

On replacing the condensation product by phenylmethylcarbinol under the same fixing conditions, the water-in-oil emulsion breaks and the printing paste is unusable.

EXAMPLE 5

Coloured discharge effects may be obtained with vat dyes on dischargeable dyed backgrounds. In this case a printing paste is prepared containing the following ingredients:

- 10 parts of the dyestuff known as Solanthrene Scarlet FB optimum paste (C.I. Vat Red 6, No. 73355)
- 12 parts of cold water
- 5 parts of the condensation product from one mole of ethylene glycol and 2 moles of acrylonitrile
- 5 parts of potassium carbonate
- 60 parts of thickener based on 25% industrial gum
- 8 parts of basic zinc formaldehyde sulphoxylate 100 parts A fabric of cellulose triacetate fibres known as "Arnel," previously dyed with 3% of 2-hydroxy-5-methyl-4'-acetyl-amino-azobenzene, is printed with this paste. After drying, it is steamed for 10 minutes at 102° C. in a Mather-Platt apparatus. It is finished by passing into a bath containing 2 g. per litre of hydrogen peroxide for 15 minutes at 60° C. It is rinsed and washed with soap at 45° C. in a bath containing 2 g. per litre of a condensation product from one mole of nonylphenol and 10 moles of ethylene oxide and 2 g. per litre of sodium perborate after which it is again rinsed and dried. A red print on a yellow background, with good fastness, is thus obtained.

In the absence of the above condensation product, or on replacing it with 5 parts of thiodiethylene glycol, a red print of lower tinctorial yield and of a more yellowish shade is obtained.

EXAMPLE 6

A printing paste is prepared containing the following ingredients:

- 4 parts of phenylamino 4-sulphonyl-2-nitro-diphenylamine
- 5 parts of the condensation product from one mole of ethylmercaptan and one mole of acrylonitrile
- 21 parts of water at 45° C.
- 5 parts of urea
- 65 parts of a 13% carboxymethyl starch thickener 100 parts A triacetate fabric is printed with this paste. After drying it is fixed by heat at 160° C. for 3 minutes, rinsed, washed and dried. A yellow shade having a good yield and excellent brilliance is thus obtained.

On replacing the above condensation product by 5 parts of urea, it is necessary both to increase the temperature to 180° C. and to increase the heat-fixing time to 5 minutes in order to obtain an equivalent tinctorial yield. Nevertheless, even under these conditions, the colouring obtained is distinctly duller than when the process according to the invention is used.

EXAMPLE 7

A printing paste is prepared containing the following ingredients:

- 15 parts of the dyestuff marketed under the name of Solanthrene Brilliant Green FB fine paste (C.I. Vat Green 1)
- 5 parts of thiodiethylene glycol
- 6 parts of formamide sulphinic acid
- 10 parts of urea
- 9 parts of cold water
- 50 parts of a thickener containing 50% of "British Gum"
- 5 parts of the condensation product from one mole of ethylene glycol and 2 moles of acrylonitirile 100 parts This paste is printed on a triacetate fabric and on a diacetate fabric. After drying, the fabrics are steamed at 105° C. for 10 minute in a "Mather-Platt" apparatus. They are then passed into an oxidising bath containing 1.2 g. per litre of hydrogen peroxide, washed with soap in a bath at 40° C. containing 1 g. per litre of a condensation product from one mole of nonylphenol and 10 moles of ethylene oxide, then rinsed and dried. On both these fabrics a green print is obtained, the tinctorial yield of which is distinctly superior to that obtained in the absence of the condensation product.

EXAMPLE 8

White discharge effects on a dyed dischargeable background may also be obtained. For this, a printing paste is prepared containing the following ingredients:

- 15 parts of zincformaldehyde sulphoxylate
- 4 parts of the condensation product from one mole of ethylmercaptan and one mole of acrylonitrile
- 26 parts of water at 30° C.
- 55 parts of a thickerer containing 33% industrial gum
- 2 parts of bis - [(2') - benzoxazolyl]β,4 styrene with 10% of active material 102 parts A cellulose triacetate fabric, previously dyed with 3% of the dyestuff marketed under the name of Esterophile Light Orange RJL paste, is printed with this paste. After drying, it is steamed for 5 minutes at 110° C., rinsed, soaped, washed and dried. A white print on an orange background is thus obtained.

Both in daylight and in U.V. light, it is found that the optical bleaching agent is fixed better and that the discharge print is better than in the absence of the condensation product.

EXAMPLE 9

A printing paste is prepared containing the following ingredients.

- 4 parts of the ½ cobalt complex of ['ω-5-ethyl-ureidosulphonyl - 2 - hydroxy-benzene] - <1 azo 1>-[6-bromo-2-hydroxy-naphthalene]
- 5 parts of the condensation product from one mole of thiodiethylene glycol and one mole of acrylonitrile
- 36 parts of water at 80° C.
- 55 parts of a thickener containing 33% industrial gum 100 parts A fabric of cellulose triacetate is printed with this paste. After drying, it is steamed at 130° C. for 20 minutes, rinsed, washed and dried. A bordeaux shade is thus obtained with a yield superior to that obtained on replacing the condensation product by 5 parts of thiodiethylene glycol or by 5 parts of triacetin.

EXAMPLE 10

A printing paste is prepared containing the following ingredients:

- 3 parts of [1-(2-chloro-5-sulphophenyl) - 3 - methyl-5-hydroxypyrazol]-<4 azo 1>-[4 - (1,4 - dichlorophthalazin-6-yl)carbonylamino-2-sulphobenzene]
- 5 parts of urea
- 4 parts of the condensation product from one mole of diethylene glycol and one mole of acrylonitrile
- 25 parts of water at 60° C.
- 2 parts of sodium bicarbonate
- 60 parts of a thickener containing 3% of sodium alginate
- 1 part of sodium m-nitrobenzene sulphonate 100 parts A fabric of acetate satin is printed with this paste. After drying, it is steamed at 100° C. for 20 minutes in a "Mather-Platt" apparatus, rinsed, washed and dried. A yellow shade is obtained with a tinctorial yield superior to that obtained in the absence of the above condensation product.

EXAMPLE 11

A dyebath for foularding is prepared composed of:

- 30 g. per litre of the ½ chromium complex of [4- and 5-nitro - 2 - hydroxy-benzene]-<1 azo 1>=12-hydroxynaphthalenes]
- 50 g. per litre of the condensation product from one mole of ethylmercaptan and one mole of acrylonitrile
- 12 g. per litre of a guarana thickener A cellulose triacetate worsted is foularded in this bath with a squeezing rate of about 80%. The worsted is steamed at 115° C. for an hour without intermediate drying. It is washed with water, dried and the worsted is blended on the "Gill-Box." A red shade is thus obtained with a brightness and a yield distinctly superior to those obtained in the absence of the above condensation product.

EXAMPLE 12

A paste for "Vigoureux" printing is prepared containing the following ingredients:

- 8.0 parts of the ½ chromium complex of [4- and 5-nitro - 2 - hydroxy-benzene]-<1 azo 1>-[2-hydroxynaphthalenes]

5.0 parts of the condensation product from one mole of ethylene glycol and 2 moles of acrylonitrile
66.5 parts of water at 60° C.
20.0 parts of a thickener containing 33% industrial gum
0.5 part of sodium m-nitrobenzene-sulphonate
———
100.0 parts A triacetate worsted is printed with this paste by means of a roller with 50% of the relative surface grooved. The worsted is steamed at 130° C. for 1 hour without intermediate drying, washed on a smoothing machine, the first tank containing a solution of 1 g. per litre of a condensation product of one mole of nonylphenol and 10 moles of ethylene oxide at 35° C. After drying, the worsted is blended on a "Gill-Box."

A "Vigoureux" print is thus obtained of which the tinctorial yield is distinctly superior to that obtained in the absence of the above condensation product, or when it is replaced by 5 parts of thiodiethylene glycol.

EXAMPLE 13

A printing paste is prepared containing the following ingredients:

1.5 parts of a dyestuff marketed under the name of Neutrichrome Brown BRLL (C.I. Acid Brown 292, Color Index A & A, No. 7, April 1965)
5.0 parts of the condensation product from one mole of thiodiethylene glycol and 2 moles of acrylonitrile
33.5 parts of water at 50° C.
60.0 parts of a thickener containing 4% of sodium alginate
———
100.0 parts This paste is printed on a flocked triacetate fabric on a frame. After drying, it is steamed at 100° C. for 30 minutes. It is rinsed in water and washed with soap in a bath of cold water containing 1 g. per litre of a condensation product of one mole of nonylphenol and 10 moles of ethylene oxide. It is again rinsed and washed with soap at 40° C. in a bath containing 2 g. per litre of a condensation product from one mole of nonylphenol and 10 moles of ethylene oxide and 0.05 g. per litre of Unisol RH. It is finally rinsed and dried.

A brown print is thus obtained which has good fastness to wet tests.

In the absence of the above condensation product or if it is replaced by 5 parts of thiodiethylene glycol, practically no fixation of the dyestuff takes place.

EXAMPLE 14

A printing paste is prepared containing the following ingredients:

3 parts of the 1/1 chromium complex of the product resulting from coupling one mole of diazotised 1-amino-2-hydroxy-5-nitrobenzene-3-sulphonic acid with one mole of acetoacetanilide
5 parts of a condensation product from one mole of glycerine and 2 moles of acrylonitrile
29 parts of water at 60° C.
3 parts of 30% acetic acid
60 parts of a thickener containing 33% industrial gum
———
100 parts A flocked triacetate fabric is printed with this paste. After drying, it is steamed at 102° C. for one hour, rinsed and washed with soap in the cold. A yellow print is obtained with a tinctorial yield and a brilliance superior to those obtained on replacing the above condensation product by 5 parts of thiodiethylene glycol.

EXAMPLE 15

A printing paste is prepared containing the following ingredients:

4.0 parts of the dyestuff marketed under the name of Amichrome Light Red RBL (C.I. Acid Red 226)
12.5 parts of an oil-in-water emulsion containing 80% of active material comprising a condensation product of one mole of hydrogen sulphide and 2 moles of acrylonitrile
23.5 parts of water at 60° C.
60.0 parts of a 13% carboxymethyl starch thickener
———
100.0 parts This paste is printed on a cellulose triacetate fabric. After drying, it is steamed at 100° C. for 30 minutes, rinsed and washed with soap in the cold. A red print is thus obtained having a tinctorial yield distinctly superior to that obtained on replacing the above condensation product by 10 parts of diethylene glycol.

EXAMPLE 16

In a dyebath composed of:

60 parts of the ½ chromium complex of [4- and 5-nitro-2-hydroxy-benzene]-<1 azo 4>-[1-phenyl-3-methyl-5-oxo-pyrazoles]
75 parts of the condensation product from one mole of glycerine and 2 moles of acrylonitrile
865 parts of cold water
———
1000 parts a cellulose diacetate fabric is foularded with a rate of squeezing of 60%. After drying, it is steamed at 102° C. for 10 minutes and washed for 5 minutes in a solution at 40° C. containing 2 g. per litre of a condensation product from one mole of nonylphenol and 10 moles of ethylene oxide. A red shade is obtained with good uniformity and a good tinctorial yield. In the absence of the above condensation product, it is found that practically no fixation of the dyestuff takes place.

EXAMPLE 17

In a dyebath composed of:

60 parts of the ½ chromium complex of [2-carboxybenzene]-<1 azo 4>-[1-phenyl-3-methyl-5-oxo-pyrazole]
75 parts of the condensation product from one mole of glycerine and 2 moles of acrylonitrile
865 parts of cold water
———
1000 parts a cellulose triacetate "twill" fabric is foularded, with a squeezing rate of 60%. After drying, it is heat-fixed at 215° C. for 45 seconds and washed for 5 minutes in a solution at 70° C. containing 2 g. per litre of a condensation product from one mole of nonylphenol and 10 moles of ethylene oxide. A yellow shade is thus obtained, the tinctorial yield of which is distinctly greater than in the absence of the above condensation product.

An identical result is obtained on replacing the above dyestuff by 60 parts of the metalliferous dyestuff of Example 19.

EXAMPLE 18

A printing paste is prepared containing the following ingredients:

2 parts of 1-amino-4-phenylamino-2-sulpho-anthraquinone
8 parts of thiourea
29 parts of water at 60° C.

16 parts of the condensation product from one mole of glycerine and 2 moles of acrylonitrile
45 parts of a thickener containing 33% industrial gum 100 parts A cellulose triacetate "Etamine" fabric is printed with this paste. After drying, it is steamed at a temperature of 100–102° C. for 30 minutes, rinsed, washed at 45° C. and dried. A blue shade is thus obtained which has good fastness to soaping at 90° C.

Under the same fixing conditions, this dyestuff is not fixed when printed in the presence of water and industrial gum.

The blue print previously obtained by the process of the invention has a tinctorial yield distinctly superior to those obtained on replacing the 8 parts of thiourea and the 16 parts of the above condensation product by 24 parts of N,N-bis-(cyanoethyl)-formamide, or by 24 parts of thiourea, or by 24 parts of thiodiethylene glycol.

EXAMPLE 19

A printing paste is prepared containing the following ingredients:

2.5 parts of the dyestuff marketed under the name of Lyrcamine Light Scarlet RL (C.I. Basic Red 41, Color Index A & A No. 11, April 1966)
5.0 parts of the condensation product from 1 mole of glycerine and 2 moles of acrylonitrile
6.0 parts of thiourea
21.5 parts of water at 80° C.
3.0 parts of 6° Bé. acetic acid
50.0 parts of a thickener containing 33% industrial gum
12.0 parts of an aqueous dispersion of p-phenylphenol containing 33% of active material 100.0 parts A triacetate "twill" fabric is printed with this paste. After drying, it is steamed at 102° C. for 15 minutes in a Mather-Platt apparatus, rinsed and washed with soap at 60° C.

A red shade is obtained with a tinctorial yield superior to that obtained on replacing the above condensation product by 5 parts of thiodiethylene glycol.

EXAMPLE 20

A printing paste is prepared containing the following components:

4.0 parts of the dyestuff known as Acid Fast Light Yellow 3 JL (C.I. No. 18900)
7.5 parts of 3,3'-thiodipropionitrile, prepared by the action of hydrogen sulphide on acrylonitrile in the presence of trimethylbenzylammonium hydroxide according to the processes described by Gershbein and Hurd in the "Journal of the American Chemical Society," February 1947, 69,242
2.5 parts of dichloroethane
26.0 parts of water at 80° C.
5.0 parts of thiourea
55.0 parts of a thickener based on 10% modified Guarana gum 100.0

This paste is printed on cellulose acetate and triacetate satin fabrics. After drying, these fabrics are steamed in an apparatus used for the two-phase process comprising a run of 3 minutes in the presence of superheated steam at 140° C. The fabrics are rinsed, washed and dried by the usual methods. A yellow shade having good fastness to washing at 95° C., to acid sweat, alkaline sweat and to gas fading is obtained. Similar results are obtained if the fabrics are steamed for one minute at 180° C.

Under the same conditions, but in the absence of 3,3'-thiodipropionitrile, the fixation of the dyestuff is almost nil.

EXAMPLE 21

A printing paste is prepared containing the following components:

4 parts of the dyestuff marketed under the name of Neutrichrome Red JRL (C.I. Acid Red 313, Color Index A & A No. 7, April 1965)
10 parts of the condensate the method of preparation of which is given at the end of this example
26 parts of boiling water
5 parts of thiourea
55 parts of a thickener based on 10% modified Guarana gum 100 parts This paste is printed on cellulose acetate and triacetate fabrics. After drying, the fabrics are steamed for 30 minutes at 100° C., rinsed, washed and dried by the usual methods. A red shade with a good tinctorial yield is obtained on these two fabrics.

Under the same conditions, but in the absence of the condensate, the fixation of the dyestuff is almost nil.

The condensate used may be prepared as follows:

920 parts of glycerol and 1.3 parts of sodium methylate are charged into a reactor provided with a stirring device, a thermometer, a reflux condenser and a bromine ampoule. The mixture is heated to 80° C. and then 1060 parts of acrylonitrile are slowly run in over a period of 4 hours with the aid of the ampoule. The slightly exothermic reaction enables the temperature to be maintained at between 80° C. and 90° C. The temperature is maintained for a further hour at 85° C. After cooling, 2065 parts of a yellowish and oily product are obtained which is completely miscible with water, and the molecular weight of which is 197.5 and the hydroxyl value 290.

EXAMPLE 22

A printing paste is prepared containing the following components:

4 parts of the dyestuff marketed under the name of Rose Inochrome N (C.I. 18761)
10 parts of 2 - (β-hydroxyethyl)mercapto-propionitrile, obtained by condensing 1 mole of 2-mercaptoethanol with one mole of acrylonitrile according to the process described by Hurd and Gershbein in the "Journal of the American Chemical Society," 1947, 69, 2331
16 parts of water at 95° C.
5 parts of thiourea
55 parts of a thickener based on 10% modified Guarana gum
10 parts of a 50% aqueous solution of resorcinol 100 parts This paste is printed on cellulose acetate and triacetate fabrics. After drying, these fabrics are steamed at 100° C. for 30 minutes, rinsed, washed and dried by the usual methods. A rose shade having good fastness to wet treatments is obtained on the fabrics.

Under the same conditions, but in the absence of the condensate, the fixation of the dyestuff is almost nil.

EXAMPLE 23

A printing paste is prepared containing the following components:

4.0 parts of the dyestuff marketed under the name of Amichrome Light Marine RLL (C.I. Acid Blue 252)
7.5 parts of 3,3'-thiodipropionitrile obtained by the action of acrylonitrile on sodium sulphide according to the process described by Bruson in "Organic reactions," volume V, page 111

2.5 parts of dichloroethane
16.0 parts of water at 80° C.
5.0 parts of thiourea
55.0 parts of a thickener based on 10% modified Guarana gum
10.0 parts of a 50% aqueous solution of resorcinol 100.0 parts This paste is printed on cellulose acetate and triacetate fabrics. After drying, the latter are steamed at 100° C. for 20 minutes in a Mather-Platt apparatus, rinsed, washed and dried by the usual methods. A blue shade is thus obtained on these fabrics, its tinctorial yield being superior to that obtained under the same fixation conditions in the absence of the above condensate.

EXAMPLE 24

A printing paste is prepared containing the following components:

4 parts of the dyestuff of Example 23
10 parts of the condensate of which the method of preparation is given below
26 parts of water at 80° C.
5 parts of thiourea
55 parts of a thickener based on 10% modified Guarana gum 100 parts This paste is printed on a cellulose triacetate fabric. After drying, the fabric is steamed for 20 minutes at 100° C. in a Mather-Platt apparatus, rinsed, washed and dried by the usual methods. A yellow shade is thus obtained which has good fastness to wet treatments at 95° C. and to the 30 second sublimation test at 210° C. In addition, the dynamometric strength of the fibres is practically unaltered.

Under the same conditions, but in the absence of the condensate, the fixation of the dyestuff is only moderate.

The condensate used may be prepared as follows: 9 parts of sodium methylate are dissolved in 732 parts of thiodiethylene glycol at 80° C. then 318 parts of acrylonitrile are run slowly in over a period of 50 minutes under a slight current of nitrogen while the temperature is kept at 80° C. When the introduction is finished, the temperature is maintained at 80° C. for a further 2 hours. After cooling and filtering, 900 parts of a crude product with an oily and yellowish appearance are obtained, which may be purified if desired so as to obtain the compound of the formula:

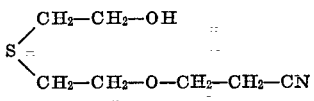

EXAMPLE 25

A printing paste is prepared containing the following components:

4 parts of the dyestuff marketed under the name of Neutrichrome Brown JRL (C.I. Acid Brown 293, Color Index A & A No. 7, April 1965)
10 parts of bis-$\beta$-cyano-ethoxy-diethyl sulphide, the method of preparation of which is given below
16 parts of water at 90° C.
5 parts of thiourea
55 parts of a thickener based on 10% modified Guarana gum
10 parts of a 50% aqueous solution of resorcinol 100 parts This paste is printed on a cellulose triacetate fabric. After drying, the fabric is steamed for 20 minutes at 100° C. in a Mather-Platt apparatus, rinsed, washed and dried by the usual methods. A brown shade is thus obtained which has good fastness to wet treatments.

Under the same conditions, but in the absence of bis-$\beta$-cyano-ethoxy-diethyl sulphide, the fixation of the dyestuff is only moderate.

The bis-$\beta$-cyanoethoxy-diethyl sulphide can be prepared as follows:

15 parts of caustic soda are dissolved in 610 parts of thiodiethylene glycol at a temperature of 30° C. then 530 parts of acrylonitrile are slowly run in at a temperature of 30–35° C. over a period of 4 hours. When the addition is finished, the reaction mass is maintained at a temperature of 80° C. for a further hour. After cooling and filtering 1110 parts of a yellowish oily product are thus obtained which can be purified by distillation under vacuum.

EXAMPLE 26

A printing paste is prepared containing the following components:

4 parts of the dyestuff used in Example 24
10 parts of the condensate, the method of preparation of which is described below
26 parts of boiling water
5 parts of thiourea
55 parts of a thickener based on 10% modified Guarana gum 100 parts This paste is printed on a cellulose triacetate fabric. After drying, the fabric is steamed at 140° C. for 3 minutes as in Example 23, rinsed, washed and dried according to the usual methods. A red shade having good fastness to wet treatments is thus obtained.

Under the same conditions, but in the absence of the condensate, the tinctorial yield obtained is smaller.

The condensate used can be prepared as follows: 10.5 parts of sodium methylate are dissolved in 742 parts of diethylene glycol at 80° C. then 371 parts of acrylonitrile are run slowly in at this temperature under a slight current of nitrogen in a period of one and a half hours. When the addition is finished, the mixture is maintained at 80° C. for a further 4 hours. After cooling and filtering, 1125 parts of a crude product with a yellowish and oily appearance are obtained which if desired may be purified in order to obtain the compound of the formula:

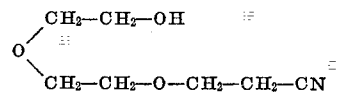

EXAMPLE 27

A printing paste is prepared containing the following components:

4 parts of the dyestuff marketed under the name of Foulon Blue 2R (C.I. 50315)
10 parts of 2-($\beta$-hyroxyethyl)mercapto-propionitrile
5 parts of thiourea
21 parts of water at 90 C.
55 parts of a thickener based on 33% industrial gum
5 parts of a 50% aqueous solution of resorcinol 100 parts This paste is printed on cellulose acetate and triacetate fabrics. After drying, these fabrics are steamed at 100° C. for 15 minutes in a Mather-Platt apparatus, rinsed, washed and dried according to the usual methods. A blue shade is thus obtained of which the tinctorial yield is superior to that obtained under same fixation conditions by replacing the 2-($\beta$-hydroxyethyl)mercapto-propionitrile by 10 parts of thiodiethylene-glycol.

When the cellulose triacetate fabric printed as above is dried, then heat-fixed in hot air at a temperature of 200° C. for one minute, and after rinsing, washing and drying according to the usual methods, a blue shade is obtained, although under the same fixation conditions, but replacing the 2-($\beta$-hydroxyethyl)mercapto-propionitrile by 10 parts of thiodiethylene glycol, the fixation of the dyestuff is almost nil.

EXAMPLE 28

A printing paste is prepared containing the following components:

- 2 parts of the dyestuff marketed under the name of Dimacid Light Yellow 3JL extra (C.I. Acid Yellow 178)
- 10 parts of the condensate from one mole of glycerine with 2 moles of acrylonitrile
- 23 parts of water
- 5 parts of thiourea
- 55 parts of a thickener based on 33% industrial gum
- 5 parts of a 50% aqueous solution of resorcinol 100 parts This paste is printed on cellulose acetate and triacetate fabrics. After drying, the latter are steamed at 102° C. for 15 minutes in a Mather-Platt apparatus, rinsed, washed and dried according to the usual methods. A yellow shade is thus obtained of which the tinctorial yield is distinctly superior to that obtained, under the same conditions of fixation, in the absence of the above condensate. The colorations thus obtained have very good fastness to washing at 95° C. in the presence of soap and sodium carbonate, to degradation tests caused by acid or alkaline sweat and to gas fading.

Finally, in order to obtain, in the absence of the above condensate, a tinctorial yield of the same order, it is necessary to steam the cellulose triacetate fabric under pressure at a temperature of 130° C. for 20 minutes.

EXAMPLE 29

A printing paste is prepared containing the following components:

- 5 parts of the dyestuff marketed under the name of Acetacid Red B (C.I. 18110)
- 15 parts of 2-($\beta$-hydroxyethyl)mercapto-propionitrile
- 10 parts of water at 95° C.
- 10 parts of thiourea
- 50 parts of a thickener based on 10% modified Guarana gum
- 10 parts of a 50% aqueous solution of resorcinol 100 parts This paste is printed on cellulose acetate and triacetate fabrics. After drying, these fabrics are steamed at 100° C. for 20 minutes for the acetate fabric and 45 minutes for the triacetate fabric. After rinsing, washing and drying according to the usual methods, a red shade is obtained on these fabrics of which the tinctorial yield is superior to that obtained under the same conditions of fixation on replacing the 2-($\beta$-hydroxyethyl) mercapto-propionitrile by 15 parts of thiodiethylene glycol.

EXAMPLE 30

In a dyebath composed of:

- 100 parts of the dyestuff marketed under the name of Dimacid Light Blue 2BL (C.I. Acid Blue 62, No. 62045)
- 100 parts of the condensation product of one mole of glycerine with 2 moles of acrylonitrile
- 100 parts of thiourea
- 700 parts of cold water 1000 parts a cellulose triacetate coarse muslin or bolting cloth is foularded with an impregnating ratio of 70% then it is rolled up on a roller and left for 6 hours at 100° C., the initial proportion of moisture being maintained practically constant during this time. The fabric is then unrolled, washed for 5 minutes at a temperature of 70° C. in a solution containing 2 g. per litre of the condensation product of one mole of nonylphenol with 10 moles of ethylene oxide, rinsed and dried. A blue shade is thus obtained which has good fastness to washing with soap and the tinctorial yield of which is distinctly better than that obtained in the absence of the above condensate.

EXAMPLE 31

In a dyebath composed of:

- 200 parts of the dyestuff marketed under the name of Amichrome Light Yellow 3 RLL fluid paste (C.I. Acid Yellow 119)
- 100 parts of the condensation product of one mole of glycerine with 2 moles of acrylonitrile
- 700 parts of cold water 1000 parts a cellulose triacetate fabric is foularded with an impregnating rate of 70%, then it is rolled up on a roller and left for 6 hours at 100° C., the initial proportion of moisture being maintained practically constant during this time. The fabric is then unrolled, rinsed, washed and dried according to the usual methods. A yellow shade is thus obtained with a tinctorial yield distinctly greater than that obtained in the absence of the above condensate.

EXAMPLE 32

In a dyebath composed of:

- 20 parts of the dyestuff marketed under the name of Dimacid Light Blue JL (C.I. Acid Blue 25, No. 62055)
- 120 parts of the condensation product of one mole of glycerine with 2 moles of acrylonitrile
- 860 parts of cold water 1000 parts a cellulose diacetate fabric is foularded with an impregnating rate of 60%. After drying, the fabric is steamed at 103° C. for 15 minutes, washed for 5 minutes at a temperature of 40° C. in a solution containing 2 g. per litre of the condensation product of one mole of nonylphenol with 10 moles of ethylene oxide, rinsed and dried. An intense blue shade is obtained which has a good fastness to washing, rubbing and light.

Under the same conditions, but in the absence of the above condensate, the tinctorial yield obtained is practically nil.

EXAMPLE 33

In a dyebath composed of:

- 120 parts of the dyestuff marketed under the name of Amichrome Light Red RBL paste (C.I. Acid Red 226)
- 80 parts of the condensation product of one mole of glycerine with 2 moles of acrylonitrile
- 800 parts of cold water 1000 parts a cellulose diacetate fabric is foularded with an impregnating rate of 60%. After drying, the fabric is steamed at 104° C. for 20 minutes, washed, rinsed and dried according to the usual methods. An intense red shade is thus obtained which has a good fastness to washing, light and rubbing, although under the same conditions but in the absence of the above condensate the tinctorial yield obtained is practically nil.

In addition, on replacing the above condensate by 80 parts of thiourea the tinctorial yield obtained is lower than that obtained according to this process.

EXAMPLE 34

In a dyebath composed of:

20 parts of the dyestuff of Example 36
200 parts of the condensation product of one mole of glycerine with 2 moles of acrylonitrile
50 parts of thiourea
730 parts of cold water ---
1000 parts a cellulose triacetate fabric is foularded with an impregnating rate of 70%. After drying, the fabric is steamed at 104° C., for 30 minutes, rinsed, washed and dried according to the usual methods. A blue shade is thus obtained which is fast to washing and to light, although under the same conditions, but in the absence of the above condensate, the tinctorial yield obtained is lower and the evenness of colour is very bad.

EXAMPLE 35

In a dyebath composed of:

120 parts of the dyestuff of Example 37
120 parts of the condensation product of one mole of glycerine with 2 moles of acrylonitrile
50 parts of thiourea
710 parts of cold water ---
1000 parts a cellulose diacetate fabric is foularded with an impregnating rate of 70%. After drying, the fabric is heat-fixed in hot air at 180° C. for 1 minute, and is rinsed, washed and dried according to the usual methods. A red shade is thus obtained which is fast to washing and to light although under the same conditions, but in the absence of the above condensate, with or without thiourea, the tinctorial yield obtained is practicaly nil.

EXAMPLE 36

In a dyebath composed of:

20 parts of the dyestuff of Example 36
120 parts of the condensation product of one mole of glycerine with 2 moles of acrylonitrile
860 parts of cold water ---
1000 parts cellulose diacetate and triacetate fabrics are foularded with an impregnating rate of 70%. After drying, these fabrics are heat-fixed in hot air at 180° C. for 1 minute for the diacetate and at 220° C. for 1 minute for the triacetate respectively. After rinsing, washing and drying according to the usual methods, an intense blue shade is obtained on these fabrics which is fast to washing and light and the tinctorial yield of which is superior to that obtained under the same conditions in the absence of the above condensate.

We claim:
1. In the method of dyeing, printing, discharging or optical bleaching of a material based on cellulose acetate, the improvement which comprises the incorporation, as a carrier, of the product obtained by cyanoalkylating a compound containing at least one mobile hydrogen atom selected from the group and consisting of water, alcohols, polyols, oximes, hydrogen, sulfide, sodium sulfide, mercaptans, acetaldehyde and nitromethane with acylonitrile, α-methylacrylonitrile or crotonitrile.

2. A method according to claim 1, wherein the carrier compound is an ingredient in a printing paste and is used in an amount of from 0.5 to 30% of the total weight of the paste.

3. A method according to claim 1, wherein the carrier compound is an ingredient in a dyebath and is used in an amount of from 5 to 300 gms./litre of dyebath liquid.

4. A method according to claim 3, wherein the carrier compound is used in an amount of from 50 to 100 gms./litre of liquid.

5. A method according to claim 1, wherein the carrier compound is the product resulting from the condensation of one molecule of glycerol with two moles of acrylonitrile.

6. A method according to claim 1, wherein the carrier compound is the product resulting from the condensation of one mole of 2-mercapto ethanol with one mole of acrylonitrile.

7. In a composition for subjecting a material based on cellulose acetate to dyeing, printing, discharging or optical bleaching, the improvement which comprises the incorporation, as a carrier, of the product obtained by cyanoalkylating a compound containing at least one mobile hydrogen atom selected from the group consisting of water, alcohols, polyols, oximes, hydrogen sulfide, sodium sulfide, mercaptans, acetaldehyde and nitromethane with acrylonitrile, α-methylacrylonitrile or crotonitrile.

8. A composition according to claim 7, wherein the carrier compound is the product resulting from the condensation of one molecule of glycerol with two moles of acrylonitrile.

9. A composition according to claim 7, wherein the carrier compound is the product resulting from the condensation of one mole of 2-mercapto ethanol with one mole of acrylonitrile.

References Cited

UNITED STATES PATENTS

| | | | |
|---|---|---|---|
| 1,398,357 | 11/1921 | Briggs et al. | 8—59 |
| 2,518,644 | 8/1950 | Seymour et al. | 8—59 |
| 3,206,274 | 9/1965 | Myles | 8—131 |

GEORGE F. LESMES, Primary Examiner

T. J. HERBERT, Jr., Assistant Examiner

U.S. Cl. X.R.

8—85